US008258423B2

(12) United States Patent
Severance, Jr. et al.

(10) Patent No.: US 8,258,423 B2
(45) Date of Patent: Sep. 4, 2012

(54) RETRACT START PLASMA TORCH WITH REVERSIBLE COOLANT FLOW

(75) Inventors: Wayne Stanley Severance, Jr., Darlington, SC (US); Ruben A. Chico, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 609 days.

(21) Appl. No.: 12/538,567

(22) Filed: Aug. 10, 2009

(65) Prior Publication Data

US 2011/0031224 A1 Feb. 10, 2011

(51) Int. Cl.
*B23K 9/00* (2006.01)

(52) U.S. Cl. ......... 219/121.48; 219/121.49; 219/121.59; 219/75; 219/124.03; 219/137.31

(58) Field of Classification Search .................... 219/75, 219/76.16, 121.48–59
See application file for complete search history.

(56) References Cited

U.S. PATENT DOCUMENTS

| | | | |
|---|---|---|---|
| 2,683,791 | A | 7/1954 | Ruehlemann et al. |
| 2,898,441 | A | 8/1959 | Reed et al. |
| 2,923,809 | A | 2/1960 | Clews et al. |
| 3,004,189 | A | 10/1961 | Giannini |
| 3,106,632 | A | 10/1963 | Eschenbach et al. |
| 3,210,586 | A | 10/1965 | Clevett, Jr. |
| 3,238,349 | A | 3/1966 | Anderson et al. |
| 3,242,305 | A | 3/1966 | Kane et al. |
| 3,740,522 | A | 6/1973 | Muehlberger |
| 3,818,174 | A | 6/1974 | Camacho |
| 3,823,302 | A | 7/1974 | Muehlberger |
| 3,858,072 | A | 12/1974 | Dembovsky |
| 4,055,741 | A | 10/1977 | Bykhovsky et al. |
| 4,059,743 | A | 11/1977 | Esibian et al. |
| 4,234,778 | A | 11/1980 | Willems et al. |
| 4,321,454 | A | 3/1982 | Willems et al. |
| 4,370,539 | A | 1/1983 | Garlanov et al. |
| 4,590,354 | A | 5/1986 | Marhic et al. |
| 4,598,191 | A | 7/1986 | Marhic et al. |
| 4,682,005 | A | 7/1987 | Marhic |

(Continued)

FOREIGN PATENT DOCUMENTS

EP 1 599 075 A2 11/2005

(Continued)

OTHER PUBLICATIONS

International Search Report and Written Opinion for Application No. PCT/US2010/044081 dated Dec. 1, 2010.

*Primary Examiner* — Michael Lebentritt

(57) ABSTRACT

An improved plasma torch and method of starting the torch are provided. The torch may comprise a main torch body with an electrode assembly coupled to a piston therein. The piston and electrode assembly are moveable between a starting position whereby the electrode assembly contacts a nozzle, and an operating position whereby the electrode assembly does not contact the nozzle. The piston is moveable by directing fluid, which may comprise coolant, through the plasma torch either in a first direction which biases the piston to the starting position, or in an opposite second direction which biases the piston so as to retract the electrode assembly to the operating position. A reversing valve or reversible pump may be used to control the direction of the flow of the fluid. Thereby, the coolant supply may be used to both cool the torch and control the starting and operation of the torch.

22 Claims, 12 Drawing Sheets

U.S. PATENT DOCUMENTS 4,692,582 A 9/1987 Marhic
4,788,408 A * 11/1988 Wlodarczyk et al. .... 219/121.49
4,791,268 A 12/1988 Sanders et al.
4,902,871 A 2/1990 Sanders et al.
4,929,811 A 5/1990 Blankenship
5,164,569 A 11/1992 Porra et al.
5,166,494 A 11/1992 Luo et al.
5,304,770 A 4/1994 Takabayashi
5,406,047 A 4/1995 Katschinski et al.
5,409,164 A * 4/1995 Delzenne et al. ............... 239/79
5,591,356 A 1/1997 Sakuragi et al.
5,637,242 A 6/1997 Muehlberger
5,760,363 A 6/1998 Hackett et al.
5,796,067 A * 8/1998 Enyedy et al. ........... 219/121.52
5,841,095 A 11/1998 Lu et al.
5,859,403 A 1/1999 Zigliotto
5,897,795 A * 4/1999 Lu et al. ................... 219/121.57
5,938,949 A * 8/1999 Enyedy et al. ............. 219/121.5
5,977,510 A 11/1999 Lindsay
5,994,663 A 11/1999 Lu
6,054,670 A 4/2000 Naor
6,084,199 A 7/2000 Lindsay et al.
6,130,399 A 10/2000 Lu et al.
6,163,009 A 12/2000 Hardwick et al.
6,242,710 B1 6/2001 Naor
6,323,583 B1 11/2001 Gunther et al.
6,337,460 B2 * 1/2002 Kelkar et al. .............. 219/121.5
6,346,685 B2 * 2/2002 Severance et al. ......... 219/121.5
6,486,430 B2 11/2002 Naor
6,677,551 B2 1/2004 Hardwick
6,703,581 B2 3/2004 Jones et al.
6,815,632 B2 11/2004 Dallavalle
6,841,754 B2 1/2005 Cook et al.
6,852,944 B2 * 2/2005 MacKenzie et al. ..... 219/121.49
6,946,616 B2 * 9/2005 Kinerson et al. ......... 219/121.49
6,969,819 B1 * 11/2005 Griffin ..................... 219/121.48
6,979,796 B1 * 12/2005 Hardwick ................ 219/121.48
7,022,935 B1 4/2006 Matus et al.
7,071,443 B2 * 7/2006 Conway et al. .......... 219/121.48
7,423,235 B2 9/2008 Severance, Jr.
2002/0117483 A1 * 8/2002 Jones et al. .............. 219/121.57
2003/0010756 A1 1/2003 Enyedy
2003/0034333 A1 * 2/2003 Horner-Richardson et al. ........................ 219/121.51
2004/0020900 A1 * 2/2004 Wu ............................ 219/121.5
2004/0050824 A1 3/2004 Samler
2004/0159644 A1 8/2004 Zhang et al.
2004/0195219 A1 * 10/2004 Conway et al. .......... 219/121.52
2004/0200809 A1 * 10/2004 MacKenzie et al. ..... 219/121.49
2005/0072762 A1 4/2005 Delgado
2005/0199593 A1 9/2005 Ignatchenko et al.
2005/0279735 A1 12/2005 Delgado et al.
2006/0118526 A1 6/2006 McGushion
2006/0175299 A1 8/2006 Hutchison et al.
2006/0237399 A1 * 10/2006 Horner-Richardson et al. ........................ 219/121.51
2006/0243715 A1 11/2006 Borne et al.
2006/0289393 A1 12/2006 Revel et al.
2006/0289394 A1 12/2006 Revel et al.
2006/0289398 A1 * 12/2006 Cook et al. ................. 219/121.5
2007/0017912 A1 1/2007 Flood et al.
2008/0083711 A1 * 4/2008 Twarog et al. ........... 219/121.48
2008/0116179 A1 * 5/2008 Cook et al. ............... 219/121.48
2009/0308849 A1 * 12/2009 Brandt et al. ............ 219/121.49
2010/0264120 A1 * 10/2010 Reinke et al. .............. 219/121.5
2012/0031881 A1 * 2/2012 Griffin ....................... 219/121.5

FOREIGN PATENT DOCUMENTS

WO WO 90/03243 A1 4/1990

* cited by examiner

RETRACT START PLASMA TORCH WITH REVERSIBLE COOLANT FLOW

BACKGROUND OF THE INVENTION

The present application relates to plasma torches and associated methods. Plasma torches are commonly used for cutting and welding. A plasma torch typically includes an electrode positioned within a nozzle. A pressurized gas is supplied to the torch and flows through the nozzle and proximate to the electrode, and an electric arc is established between the electrode and a workpiece. According to one typical method for starting a plasma torch, a pilot mode is first initiated by establishing an arc at a relatively low current between the electrode and the nozzle. A metering system delivers a flow of gas through the nozzle during the pilot mode. The plasma torch is then switched from the pilot mode to an operating mode by transferring the arc to the workpiece so that the arc extends between the electrode and the workpiece. The current of the arc is increased for the operating mode, and the flow rate or type of gas can also be adjusted. The arc ionizes the gas, and the resulting high temperature gas can be used for cutting or other welding operations.

The present disclosure is directed to an improved plasma torch and method of starting the plasma torch.

SUMMARY OF VARIOUS EMBODIMENTS

The present disclosure in one aspect describes a plasma torch comprising a main torch body, a nozzle, and a piston in a piston cavity defined within the main torch body, wherein the piston is coupled to an electrode. A first fluid passage and a second fluid passage communicate with the piston cavity, the first fluid passage communicating with a first region of the piston cavity on a first side of the piston, and the second fluid passage communicating with a second region of the piston cavity on a second side of the piston. A connecting pathway, which may be defined in part by the nozzle or an electrode fluid passage, is configured to conduct fluid between the first and second regions of the piston cavity. The piston is configured to move the electrode between a starting position and an operating position, the electrode contacting the nozzle in the starting position, and the electrode not contacting the nozzle in the operating position.

When fluid flows in a first direction from the first fluid passage into the first region, through the connecting pathway into the second region, and then out through the second fluid passage, the piston moves the electrode to the starting position. When fluid flows in an opposite second direction from the second fluid passage into the second region, through the connecting pathway into the first region, and then out through the first fluid passage, the piston moves the electrode to the operating position. The first fluid passage and the second fluid passage may be configured to receive a flow of coolant, such as water.

In some embodiments the plasma torch may further comprise a reversing valve movable between a first position and a second position, the reversing valve operable to provide flow into the first fluid passage in the first position, and operable to provide flow into the second fluid passage in the second position. The reversing valve, which may be located between the plasma torch and a fluid heat exchanger, may comprise a four port valve. Instead of a reversible valve, the plasma torch may include a reversible pump, the reversible pump operable to provide flow into the first fluid passage in a first mode, and operable to provide flow into the second fluid passage in a second mode.

In further embodiments the electrode may comprise an electrode holder and an electrode. The electrode holder may comprise a flange, wherein the flange contacts a stop within the main torch body, such as a gas baffle, when the electrode is in the operating position. The plasma torch may further comprise a wave spring, wherein the wave spring contacts the nozzle so as to electrically connect the wave spring to the nozzle. The wave spring may function to conduct a pilot current of fifty or more amperes to the nozzle. With regard to supplying current to the electrode, the plasma torch may further comprise a contactor which contacts the piston so as to provide an electrical connection between the piston and the electrode. The contactor may be positioned circumferentially around the piston in a groove. The groove may be in the main torch body of the plasma torch so that the contactor contacts a first section of the piston when the electrode is in the starting position, and the contactor contacts a second section of the piston when the electrode is in the operating position. The groove alternatively may be in the piston, such that the contactor moves with the piston.

Embodiments of the invention further include a method of starting a plasma torch comprising flowing gas through a nozzle of the plasma torch and flowing fluid through the plasma torch in a first direction through a first fluid passage and out through a second fluid passage so as to advance a piston, whereby advancement of the piston moves an electrode into contact with the nozzle. The method may further comprise applying a pilot arc current through the electrode and the nozzle and reversing the flow of fluid such that the fluid flows in an opposite second direction through the second fluid passage and out through the first fluid passage so as to retract the piston, whereby retraction of the piston moves the electrode out of contact with the nozzle and thereby initiates a pilot arc between the nozzle and electrode. The step of reversing the flow may comprise actuating a reversing valve. Alternatively, the step of flowing fluid may comprise running a fluid pump in one direction, and the step of reversing the flow may comprise running the fluid pump in reverse.

BRIEF DESCRIPTION OF THE SEVERAL VIEWS OF THE DRAWING(S)

Having thus described the embodiments in general terms, reference will now be made to the accompanying drawings, which are not necessarily drawn to scale, and wherein:

DETAILED DESCRIPTION OF THE DRAWINGS

Apparatuses and methods for starting a plasma torch now will be described more fully hereinafter with reference to the accompanying drawings in which some but not all embodiments are shown. Indeed, the present development may be embodied in many different forms and should not be construed as limited to the embodiments set forth herein; rather, these embodiments are provided so that this disclosure will satisfy applicable legal requirements. Like numbers refer to like elements throughout.

It is known that a plasma torch can be started by a "contact start" method, which involves contacting an electrode with a nozzle and then separating the nozzle and electrode in order to create a pilot arc. One type of plasma torch which uses this method of starting a so-called "blow-back" plasma torch. In a blow-back plasma torch, the nozzle is substantially fixed in position, and the electrode is configured to translate or adjust in a direction along the axis of the torch. The electrode is biased to a forward position by a spring so that the electrode makes contact with the nozzle in a normal resting position. When a metering system provides a flow of gas to the torch, the flow of the gas urges the electrode in a direction away from the workpiece, thereby overcoming the spring and separating the electrode from the nozzle so that a pilot arc is established therebetween. In a "blow-forward" torch, the nozzle is moveable instead of the electrode, so that upon starting the nozzle is moved in a forward direction by the flow of gas through the nozzle. In each case, a pilot arc can be established between the separated nozzle and electrode, and the arc subsequently can be transferred from the nozzle to the workpiece for cutting or welding.

It is also conventional to start a plasma torch by means of inducing a high frequency, high voltage between the electrode and nozzle so as to produce a spark discharge. With this method a mechanism for producing relative movement of the nozzle and electrode is unnecessary.

However, these plasma torches and associated methods are not necessarily ideal. Successful operation of a plasma torch in high quality or high current applications can require gas flow rates or pressures incompatible with use of the plasma gas to start the torch. It is not, for example, desirable to have to shut off the gas flow in order to start the torch if that torch is being used for underwater cutting or if a tungsten electrode is being used, because consumable life could be compromised. At the same time, high frequency starting may cause many problems with nearby electronics and may require expensive shielding as a consequence.

Figure 1:
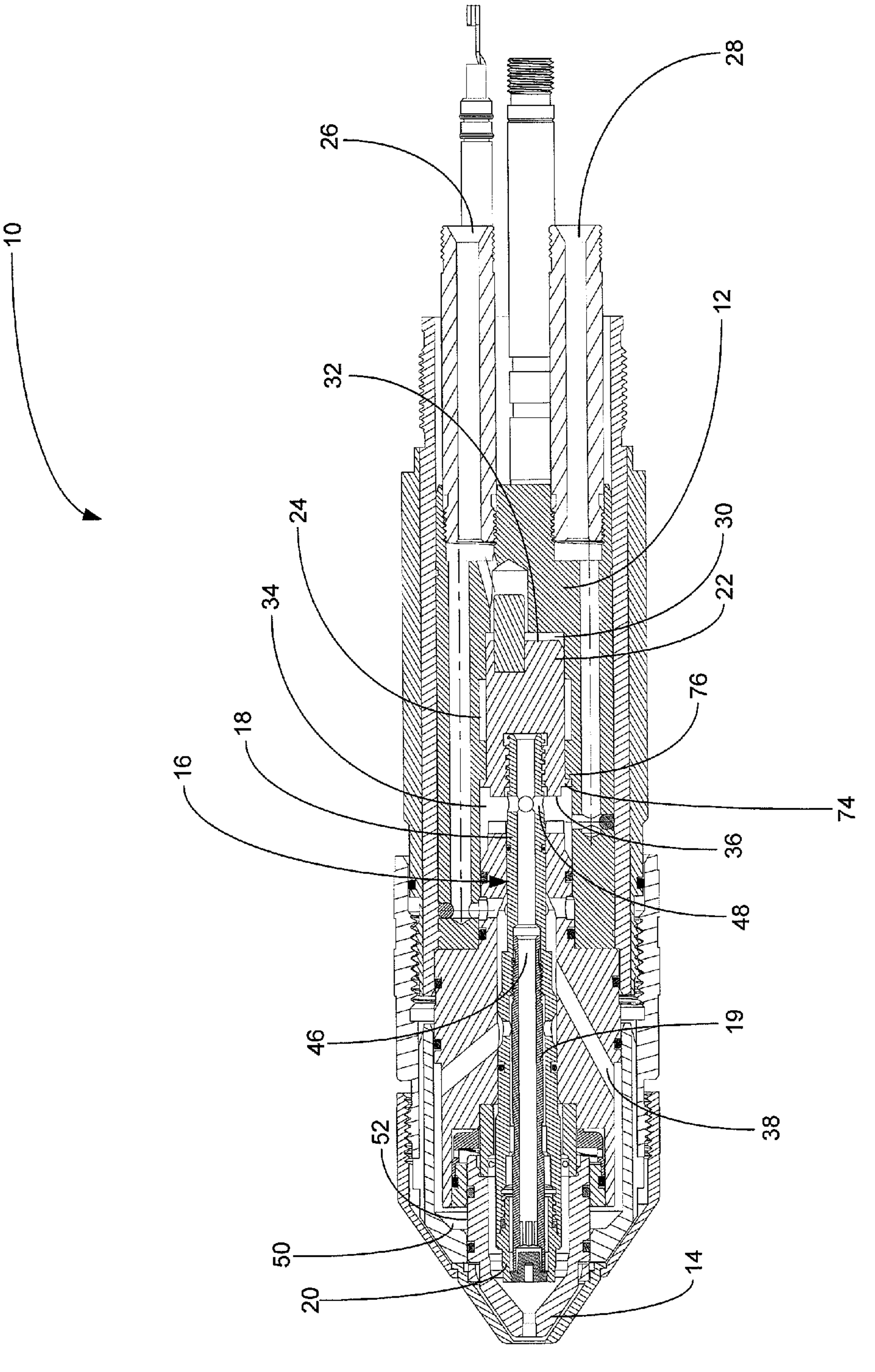
FIG. 1 illustrates a modified sectional view of an embodiment of a plasma torch.

Accordingly, Applicants have developed a plasma torch apparatus and associated methods which seek to avoid the above-mentioned problems. FIG. 1 illustrates an embodiment of a plasma torch 10 of the invention. The plasma torch 10 comprises a main torch body 12. The plasma torch 10 further includes a nozzle 14 and an electrode assembly 16. The electrode assembly 16 may comprise several pieces including an electrode holder 18 at a first end of the electrode assembly, and an electrode 20 at a second end of the electrode assembly. The electrode holder 18 is coupled to a piston 22 within the main torch body 12.

The piston 22 is situated in a piston cavity 24 within the main torch body 12 of the plasma torch 10. The piston cavity 24 is in communication with a first fluid passage 26 and a second fluid passage 28. In particular, the piston 22 may be arranged in the piston cavity 24 such that the first fluid passage 26 communicates with a first region 30 of the piston cavity 24 on a first side 32 of the piston 22 and the second fluid passage 28 communicates with a second region 34 of the piston cavity 24 on a second side 36 of the piston. A connecting pathway 38 conducts fluid between the first and second regions 30, 34 of the piston cavity 24. Thus, fluid may travel in through one of the first and second fluid passages 26, 28, into one of the first or second regions 30, 34 of the piston cavity 24, though the connecting pathway 38, into the other of the first and second regions of the piston cavity, and out through the other of the first and second fluid passages.

The first fluid passage 26 may connect to a first external line 40 (see FIGS. 5 and 6) and the second fluid passage 28 may connect to a second external line 42, with the first and second external lines supplying and returning fluid to the plasma torch 10. Thus, the fluid may travel in a closed-loop. In such embodiments the plasma torch 10 may further include a fluid heat exchanger 44 (see FIGS. 5 and 6), which cools the fluid. Use of a heat exchanger 44 to cool the fluid may be advantageous because the fluid may be a coolant, such as water, which cools the plasma torch 10. The water may be mixed with ethylene glycol or propylene glycol to form coolant which resists freezing. Additionally or alternatively, the water may be mixed with additives configured to prevent corrosion, growth of algae, and/or growth of bacteria.

Two portions of the plasma torch 10 in particular which may benefit from cooling are the electrode 20 and the nozzle 14. Thus, in one embodiment, at least part of the connecting pathway 38 may be defined by an electrode fluid passage 46 within the electrode holder 18. By flowing fluid such that it contacts the electrode 20, the fluid can cool the electrode. For example, fluid may enter through one or more apertures 48 in the electrode holder 18 and travel through the electrode fluid passage 46, which can be defined in part by a coolant tube 19 coaxially displaced within the tubular electrode holder 18. In other embodiments, the connecting pathway 38 can additionally or alternatively be defined at least in part by the nozzle 14. For example, the connecting pathway 38 can comprise a circumferential channel 50 defined on one side by an outer surface 52 of the nozzle 14. Thus, by contacting the electrode 20 and/or the nozzle 14, the fluid can cool the plasma torch 10 during operation.

In the above-described closed-loop embodiments, the fluid is heated as it travels through the plasma torch 10 and thus as described above, a fluid heat exchanger 44 may be used to cool the fluid before it is returned to the plasma torch. In alternate embodiments, an open-loop may be formed in which fluid is directed through one of the first or second passages 26, 28 and out the other of the first or second passages without being recycled. These embodiments may forego a heat exchanger because the warmed fluid exiting the plasma torch 10 is not returned into the plasma torch.

Regardless of whether a closed-loop or open-loop fluid path is used, the fluid may be used for purposes other than just cooling the plasma torch 10. One such purpose is controlling the positioning of the electrode assembly 16 in order to start and operate the plasma torch 10. Accordingly, use of a separate fluid supply may not be necessary, which may thereby significantly reduce the complexity and cost of the plasma torch 10 as compared to prior art. In this regard, the relative direction of travel of the fluid into or out of the first fluid passage 26 and the second fluid passage 28 may be used to control the positioning of the electrode assembly 16.

Figure 2:
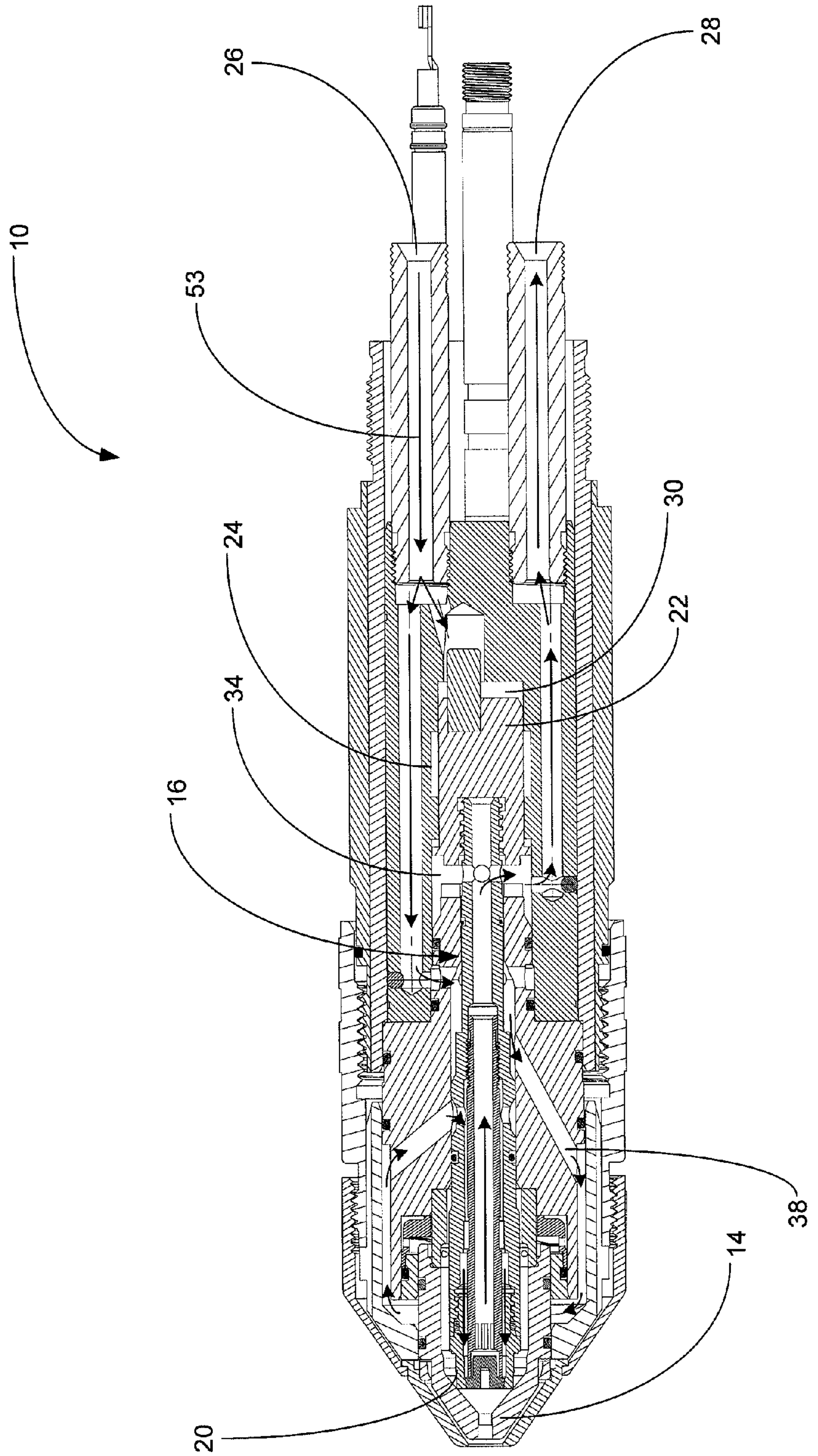
FIG. 2 illustrates coolant flow through the plasma torch of FIG. 1 in a first direction.

As illustrated in the plasma torch 10 in FIG. 2, when it is desired that the electrode assembly 16 be moved to a starting position in which the electrode 20 contacts the nozzle 14, the fluid is directed to flow in a first direction 53. Fluid flow in the first direction 53 travels through the first fluid passage 26 into the first region 30 of the piston cavity 24, through the connecting pathway 38 into the second region 34 of the piston cavity, and then out through the second fluid passage 28. Fluid flow in the first direction 53 biases the piston 22 such that the electrode 20 contacts the nozzle 14. Such movement occurs due to a pressure differential being formed between the first region 30 and the second region 34 of the piston cavity 24, with the first region having a greater fluid pressure than the second region. The pressure differential results from the pressure drop created by the tortuous path the fluid moves along as the fluid travels through the plasma torch 10.

Figure 3:
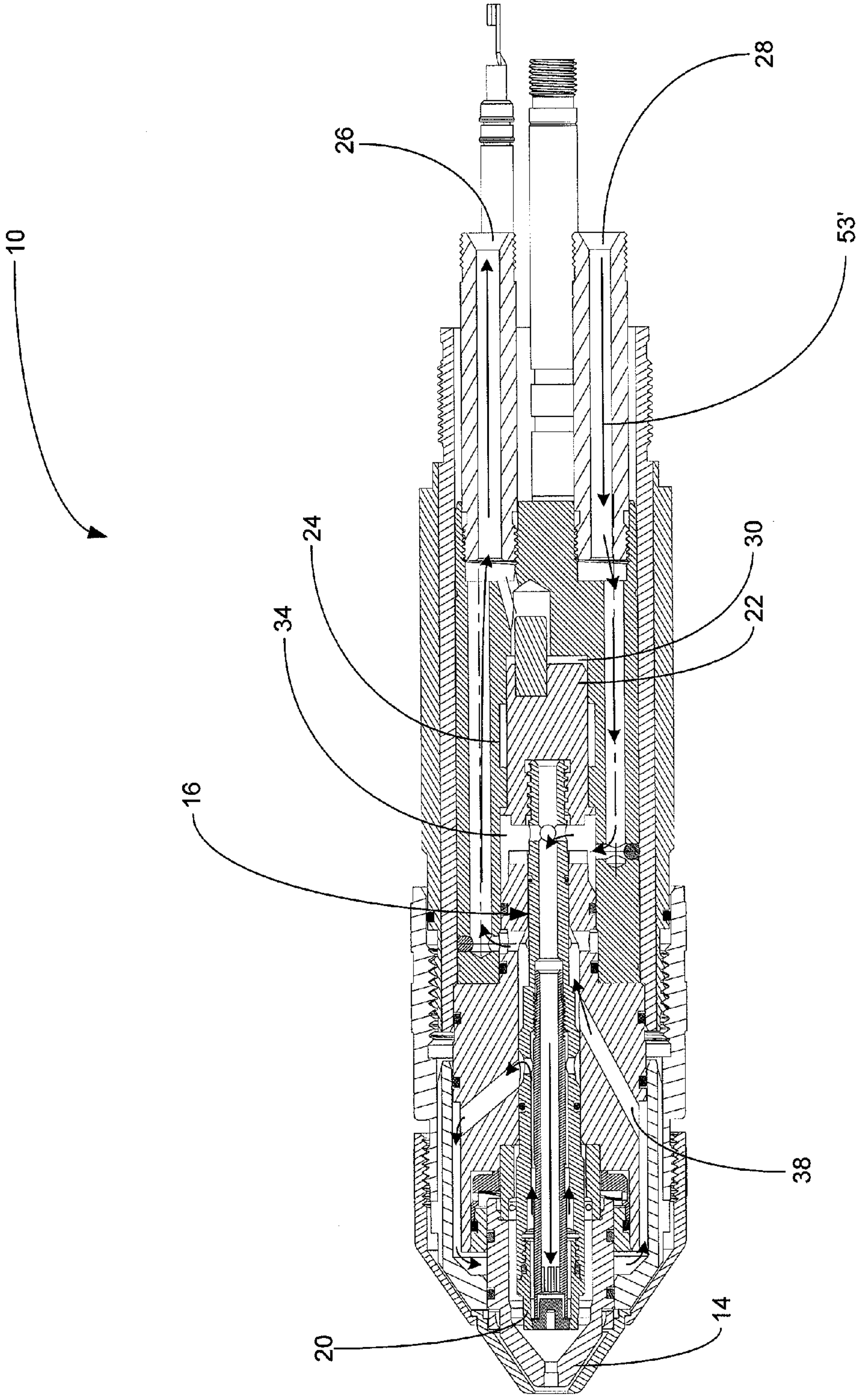
FIG. 3 illustrates coolant flow through the plasma torch of FIG. 1 in an opposite second direction.

As illustrated in the plasma torch 10 in FIG. 3, when it is desired that the electrode assembly 16 be retracted to the operating position wherein the electrode 20 does not contact the nozzle 14, the fluid is directed to flow in an opposite second direction 53'. Fluid flow in the opposite second direction 53' travels through the second fluid passage 28 into the second region 34 of the piston cavity 24, then through the connecting pathway 38 into the first region 30 of the piston cavity, and then out through the first fluid passage 26. Fluid flow in the opposite second direction 53' biases the piston 22 such that the electrode assembly 16 retracts to a position whereby the electrode 20 does not contact the nozzle 14. As stated above, the biasing is believed to occur due to a pressure differential being formed between the first region 30 and the second region 34 of the piston cavity 24 as a result of the fluid flow traveling along a tortuous path through the plasma torch 10. In the case of flow in the opposite second direction 53', the second region 34 has a greater fluid pressure than the first region 30, which thereby biases the piston 22 toward the operating position.

As described above, the direction of fluid flow through the plasma torch 10 determines whether the piston 22 moves the electrode assembly 16 to the starting position or the operating position. Therefore, the plasma torch 10 includes one or more mechanisms capable of switching the direction of flow of the fluid. Thus, some embodiments of the plasma torch 10 comprise a reversible pump (not shown). In such embodiments the reversible pump is operable to provide flow into the first fluid passage 26 in a first mode, and operable to provide flow into the second fluid passage 28 in a second mode. Thereby, the reversible pump may reverse the flow of the fluid by switching from the first mode which biases the piston 22 and electrode assembly 16 to the starting position, to the second mode which biases the piston and electrode assembly to the operating position. One method of switching the mode of the reversible pump may comprise switching the polarity of the current supplied to the reversible pump, though various other methods may be used as would be understood by one having ordinary skill in the art.

Figure 4:
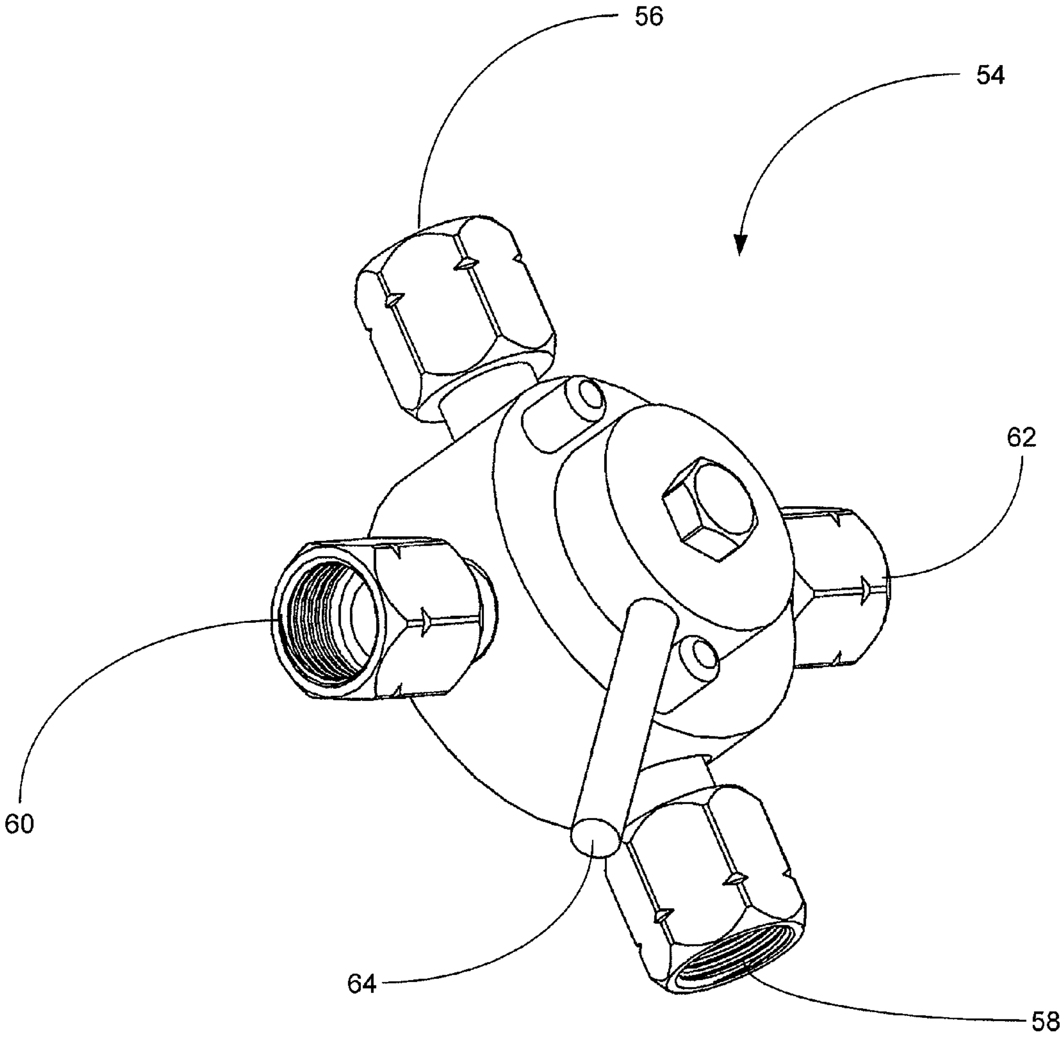
FIG. 4 illustrates a perspective view of a reversible valve.

As illustrated in FIG. 4, alternative embodiments of the plasma torch 10 may comprise a reversing valve 54 instead of the reversible pump. Various embodiments of reversing valves would be apparent to one having ordinary skill in the art. The reversing valve 54 may comprise four ports 56, 58, 60, 62, and operation of the reversing valve may be controlled by a moveable lever 64 whose movement may be automated such as through use of an air cylinder or solenoid (not shown).

Figure 5:
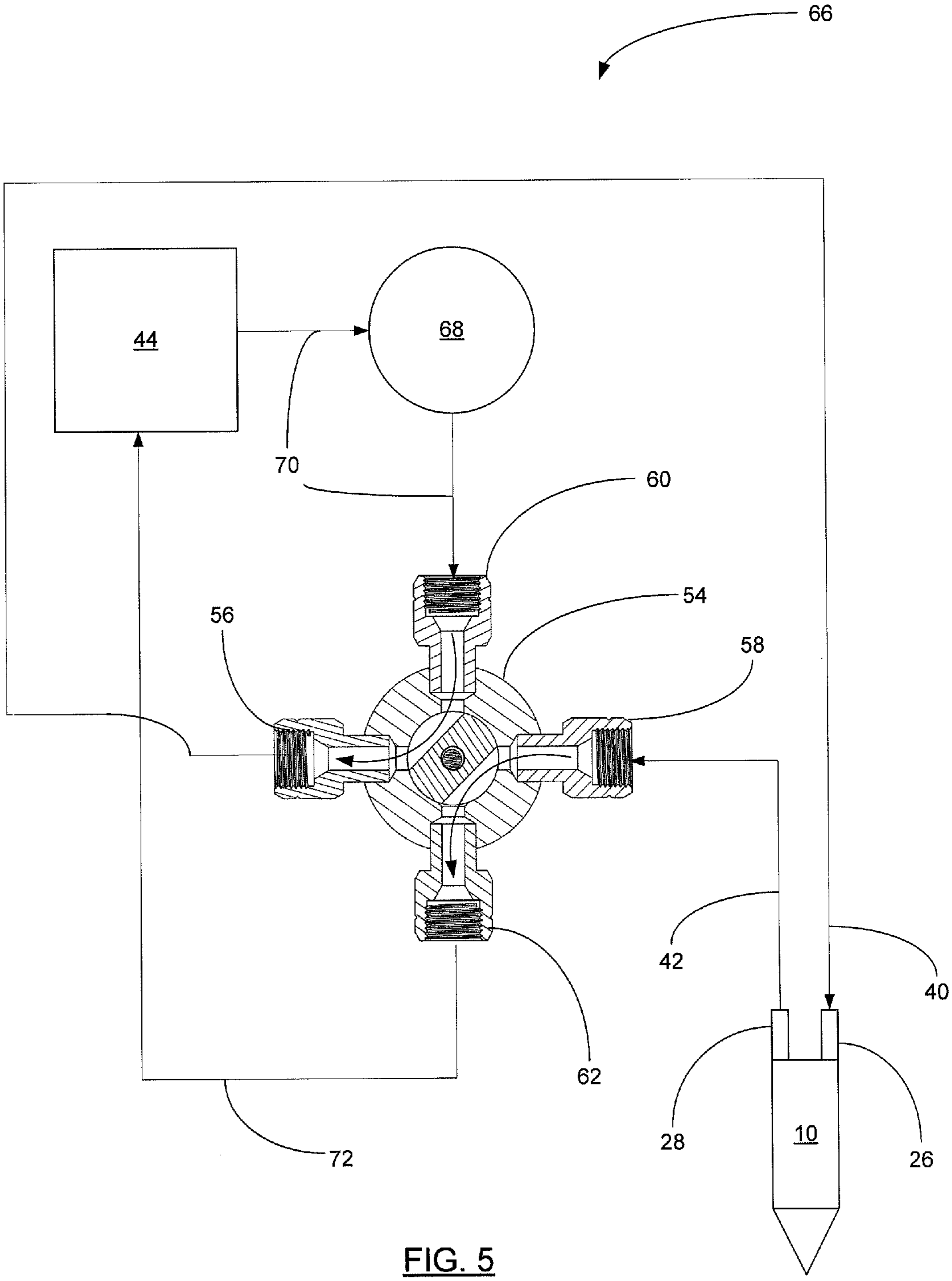
FIG. 5 illustrates a fluid circuit including a cross-sectional view of the reversible valve of FIG. 2 in a first position.

As illustrated in FIG. 5, the reversing valve 54 may be part of a closed-loop fluid circuit 66, such as one with a pump 68 and a fluid heat exchanger 44. In such an embodiment, the first and second ports 56, 58 may respectively connect to the first fluid passage 26 through the first external line 40 and the second fluid passage 28 through the second external line 42, and the third and fourth ports 60, 62 may respectively connect to the fluid heat exchanger 44 through third and fourth external lines 70, 72. The pump 68 may be located along the third or fourth external lines 70, 72 such that it is positioned between the plasma torch 10 and the fluid heat exchanger 44.

When the reversing valve 54 is in a first position as illustrated in FIG. 5, fluid flows from the pump 68 through the third external line 70 into the third port 60 of the reversing valve. The fluid is then directed out of the reversing valve 54 through the first port 56 and into the first external line 40 whereby the fluid flows into the first fluid passage 26 of the plasma torch 10 in the first direction 53, which as described above moves the piston 22 and electrode assembly 16 to the starting position (see FIG. 2). After traveling through the plasma torch 10 in the above-described manner, the warmed fluid exits the plasma torch at the second fluid passage 28 and travels through the second external line 42 whereby the fluid enters the reversible valve 54 at the second port 58. Within the reversible valve 54 the fluid is directed toward the fourth port 62, through which the fluid travels and enters the fourth external line 72. Finally, the fourth external line 72 directs the fluid through the heat exchanger 44, which cools the fluid before it is returned to the third external line 70 and the pump 68.

Figure 6:
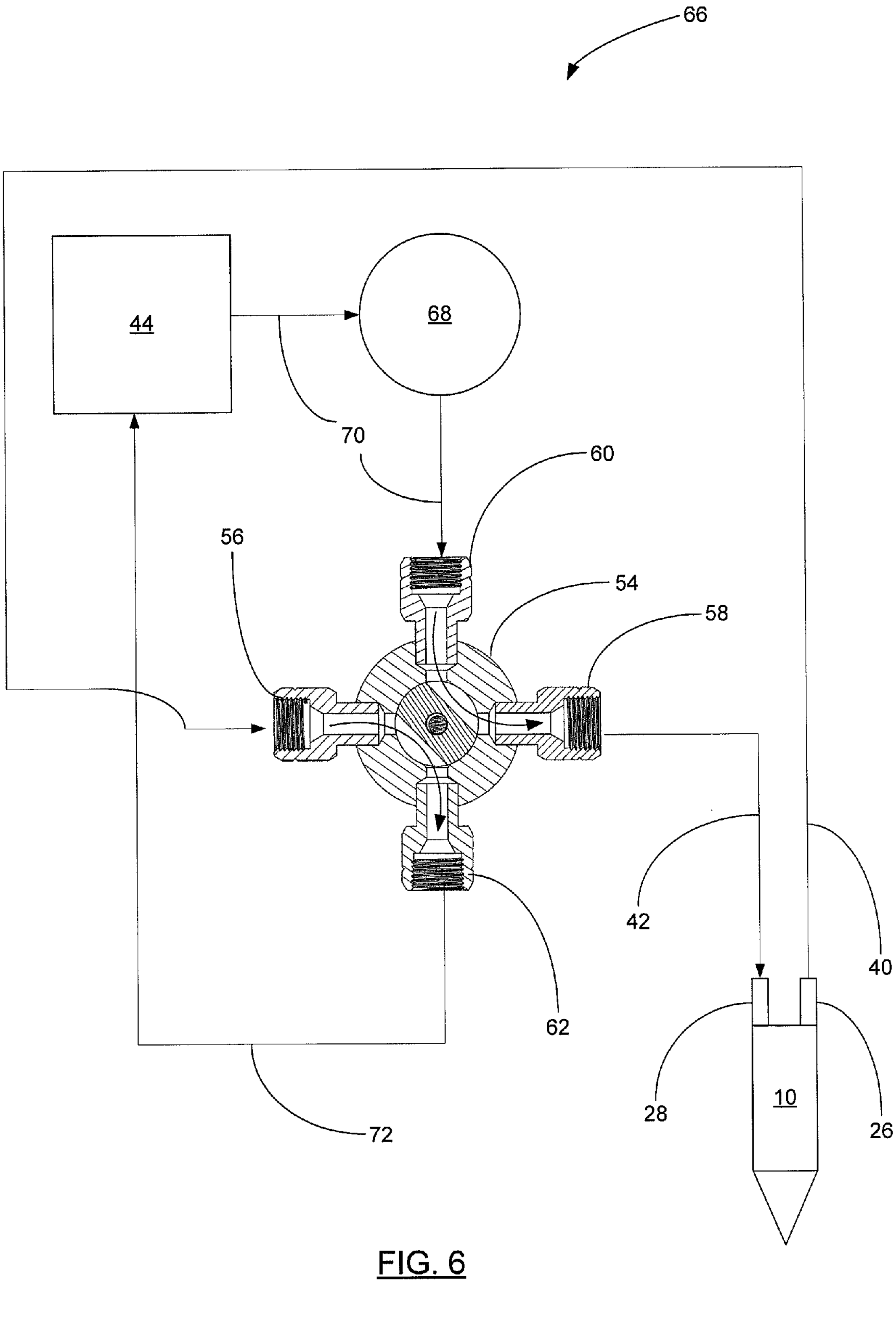
FIG. 6 illustrates a fluid circuit including a cross-sectional view of the reversible valve of FIG. 2 in a second position.

When the reversing valve 54 is moved to a second position, as illustrated in the closed-loop fluid circuit 66 in FIG. 6, fluid flows in the following manner: First, fluid flows from the pump 68 through the third external line 70 into the third port 60 of the reversing valve 54. The fluid is then directed out of the reversing valve 54 through the second port 58 and into the second external line 42 whereby the fluid flows into the second fluid passage 28 of the plasma torch 10 in the opposite second direction 53', which as described above retracts the piston 22 and electrode assembly 16 to the operating position (see FIG. 3). After traveling through the plasma torch 10 in the above-described manner, the warmed fluid exits the plasma torch at the first fluid passage 26 and travels through the first external line 40 whereby the fluid enters the reversible valve 54 at the first port 56. Within the reversible valve 54 the fluid is directed toward the fourth port 62, through which the fluid travels and enters the fourth external line 72. Finally, the fourth external line 72 directs the fluid through the heat exchanger 44, which cools the fluid before it is returned to the third external line 70 and the pump 68.

Returning to FIG. 1, the plasma torch 10 may embody various additional features. One such feature is that the travel of the piston 22 and electrode assembly 16 may be limited. With regard to the starting position, the travel of the piston 22 is limited because the electrode 20 contacts the nozzle 14. However, various embodiments of structures may be provided to prevent the piston 22 and electrode assembly 16 from traveling past a desired operating position. One embodiment, as illustrated in FIG. 1, may comprise a flange 74 on the piston 22 which engages a corresponding stop 76 within the main torch body 12 of the plasma torch 10 when the electrode assembly 16 is in the operating position. As illustrated in alternate embodiment of a plasma torch 10' in FIG. 7, the plasma torch may additionally or alternatively comprise a flange 74' on a portion of the electrode assembly 16', such as on the electrode holder 18', which contacts a corresponding stop 76' in the main torch body 12' of the plasma torch when the electrode assembly is in the operating position. In this embodiment the stop 76' may be part of a gas baffle. Use of a flange 74' extending from the electrode holder 18' has the advantage that it dramatically loosens the tolerances that must be met in machining the piston cavity 24' and piston 22'. However, this embodiment may require the use of a seal 75' between the piston 22' and main torch body 12' which may not be serviceable. In contrast, embodiments using a flange 74 on the piston 22 which engages a corresponding stop 76, as shown in FIG. 1, may not require such a seal because the flange and stop may adequately seal together.

Figure 7:
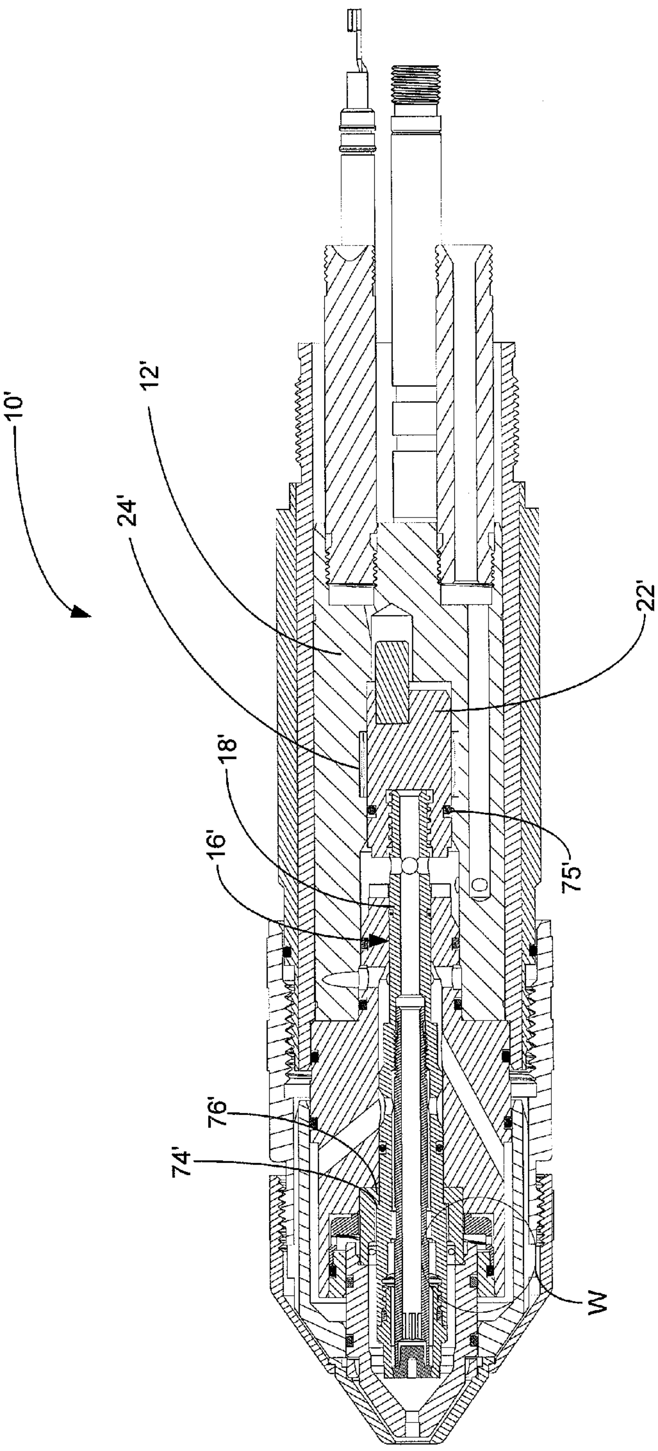
FIG. 7 illustrates a sectional view of an alternate embodiment of a plasma torch.
Figure 8:
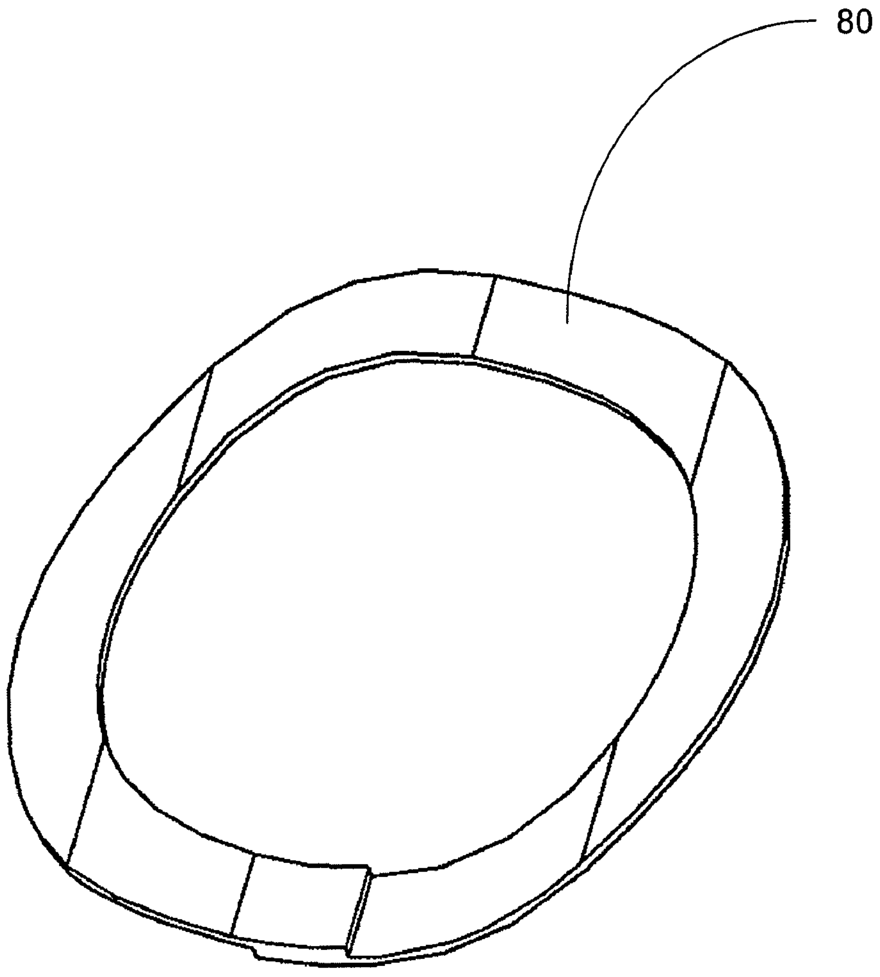
FIG. 8 illustrates a perspective view of a wave spring.
Figure 9:
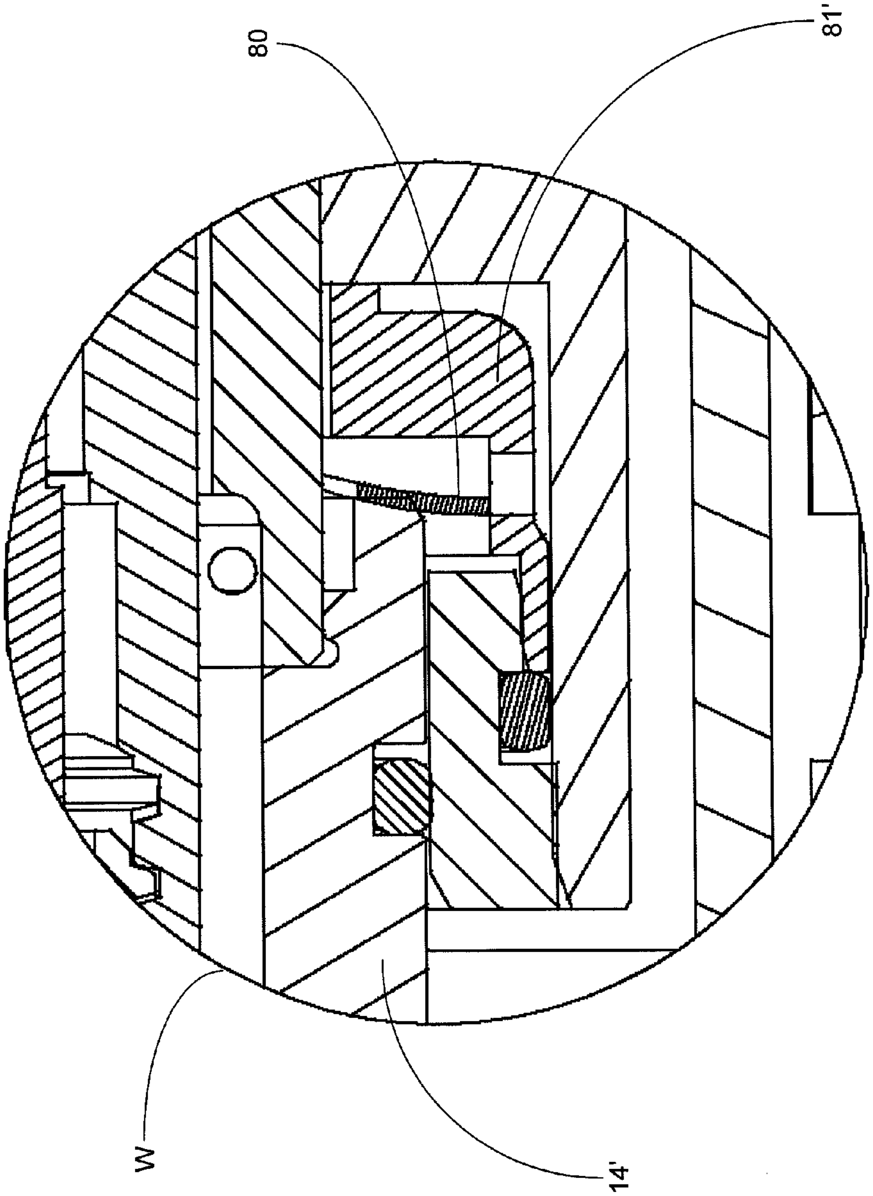
FIG. 9 illustrates an enlarged view of detail section W of FIG. 7.

Another feature which may be included in the plasma torch is an electrical connection to the nozzle to provide current thereto. The electrical connection may be established through use of a wave spring 80, as illustrated in FIG. 8. As may be seen in detail section W of FIG. 7, which is enlarged in FIG. 9, the wave spring 80 may be placed in a position such that it is compressed by the end of the nozzle 14' opposite from the tip against a front body insert 81', which may have a pilot arc lead (not shown) soldered thereto. The wave spring 80 acts to provide current to the nozzle 14', which is used to create a pilot arc during startup. The wave spring 80 overcomes issues, such as annealing, that conventional springs may have in carrying pilot arc current to the nozzle 14' in the order of fifty amperes or greater. It is hypothesized that the wave spring 80 avoids annealing at least in part because the wave spring has a minimum cross-section that is relatively larger than a similar coiled spring. Additionally, the wave spring 80 forms a "wave" shape (see FIG. 8) which results in multiple points of contact between the wave spring and the nozzle 14' and the front body insert 81'. Multiple points of contact may allow current to flow through the wave spring along a number of paths, in contrast to a coiled spring, which may provide only a single path for current flow. These multiple current flow paths within the wave spring may further contribute to a higher current carrying capacity as compared to a coiled spring, which thereby makes operation of the plasma torch possible.

Figure 10:
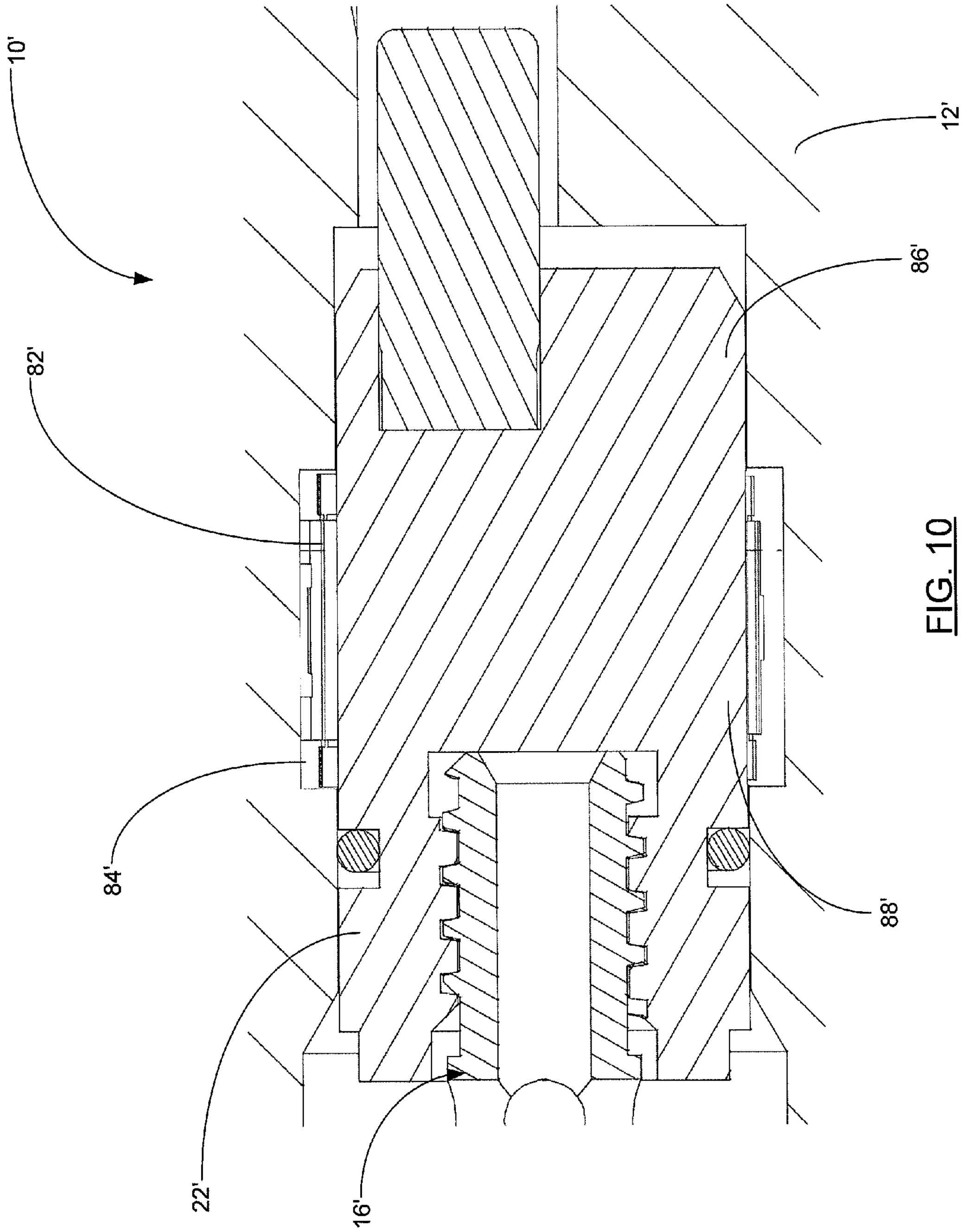
FIG. 10 illustrates an enlarged portion of FIG. 7 showing a contactor.
Figure 11:
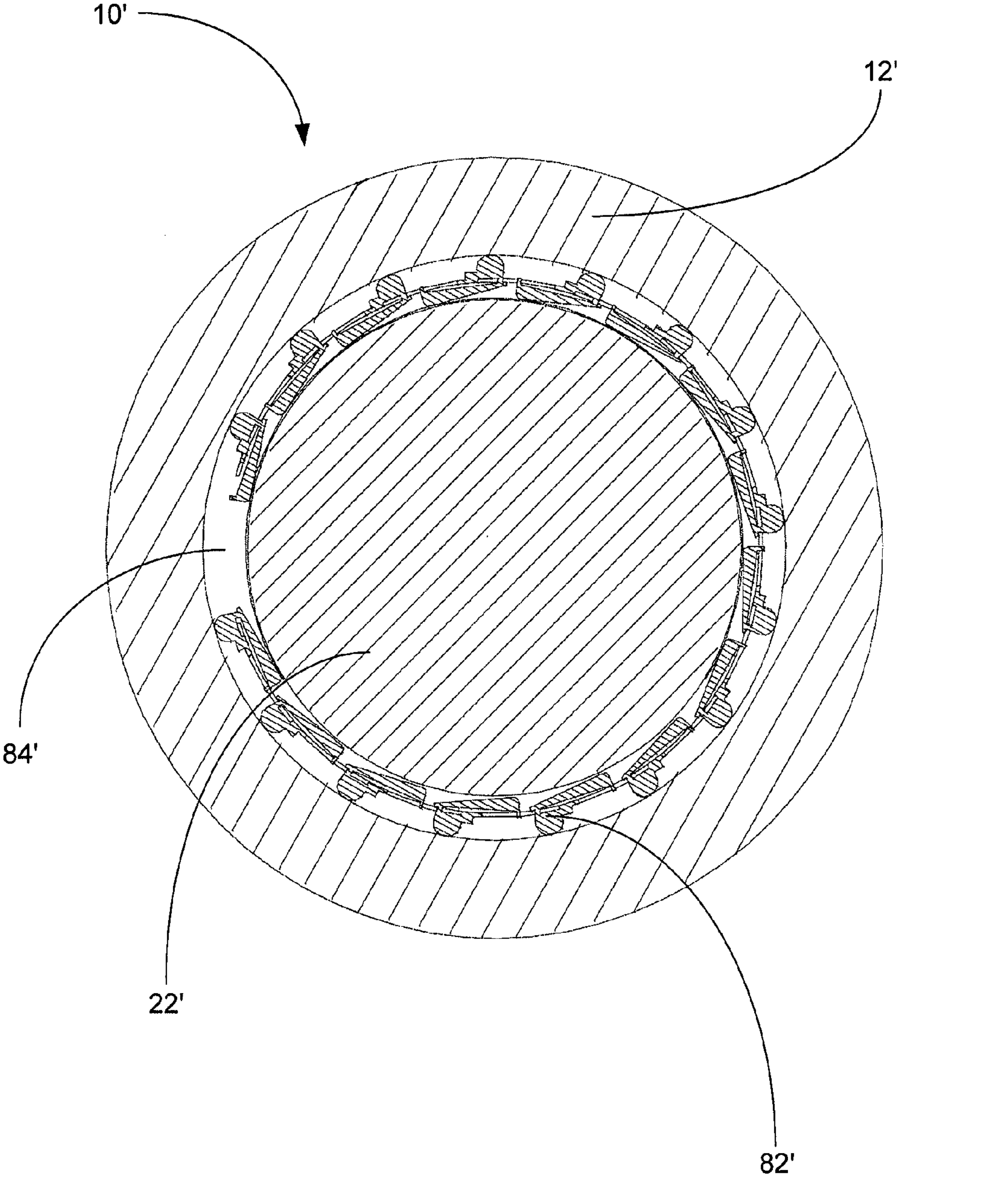
FIG. 11 illustrates a sectional view of the plasma torch of FIG. 7 at a cross-section along the longitudinal axis of the plasma torch at the contactor.

Embodiments of the plasma torch may comprise an additional feature which allows for the transfer of current to the electrode assembly. As illustrated in the detail portion of FIG. 7 shown in FIG. 10, this is accomplished with a contactor 82' that engages the piston 22'. The piston 22' in turn acts as an electrode carriage and provides passage for current to the electrode assembly 16'. The contactor 82' enables operating current to be supplied to the electrode assembly 16' despite the electrode assembly's moving relationship with respect to the main torch body 12' of the plasma torch 10'. The contactor 82' may be situated in a variety of different positions within the plasma torch 10'. For example, the contactor 82' may be positioned circumferentially around the piston 22' within a groove 84' in the main torch body 12' of the plasma torch 10', and the contactor may thereby slidingly contact the piston 22' as the piston and electrode assembly 16' move between the starting and operating positions, whereby the contactor contacts a first section 86' of the piston when the electrode assembly is in the starting position, and whereby the contactor contacts a second section 88' of the piston when the electrode assembly is in the operating position. FIG. 11 illustrates a sectional view of a portion of the plasma torch 10' along the longitudinal axis of the torch, in the region of the contactor 82'. As may be seen, the contactor 82' extends across the groove 84' to contact both the piston 22' and the main torch body 12' or a separate electrical contact. In an alternate embodiment (not shown), the contactor may be positioned circumferentially around the piston within a groove in the piston, such that the contactor moves with the piston, but functions in a similar fashion.

Figure 12:
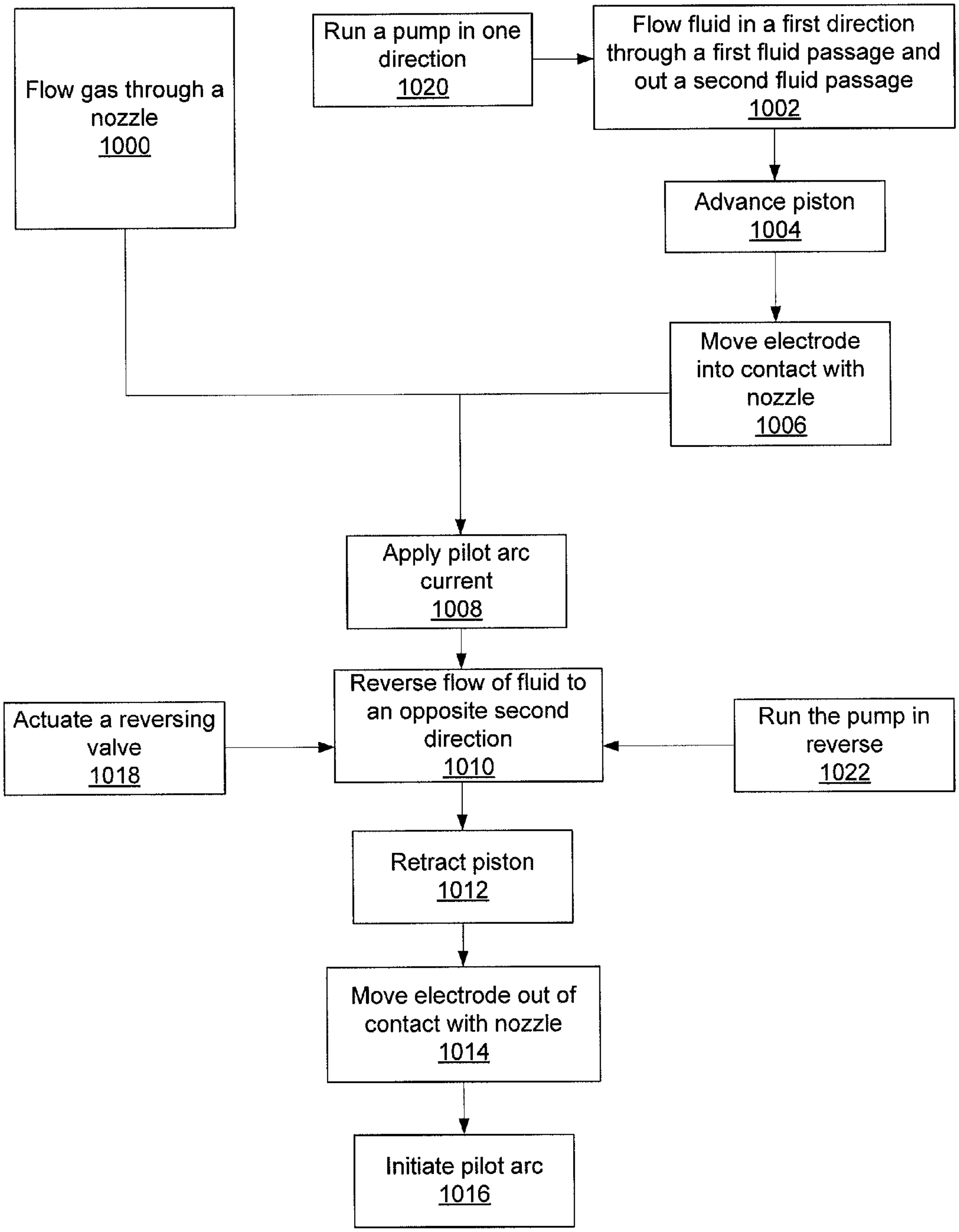
FIG. 12 illustrates a method of starting a plasma torch.

Embodiments of the invention further comprise methods of starting a plasma torch. One such method, as illustrated in FIG. 12, comprises flowing gas through a nozzle of the plasma torch (step 1000), and flowing fluid through the plasma torch in a first direction through a first fluid passage and out through a second fluid passage (step 1002) so as to advance a piston (step 1004), whereby advancement of the piston moves an electrode into contact with the nozzle 1006. The method may additionally comprise applying a pilot arc current through the electrode and the nozzle (step 1008), and reversing the flow of fluid (step 1010) such that the fluid flows in an opposite second direction through the second fluid passage and out through the first fluid passage so as to retract the piston (step 1012), whereby retraction of the piston moves the electrode out of contact with the nozzle (step 1014) and thereby initiates a pilot arc (step 1016) between the nozzle and electrode. Reversing the flow (step 1010) may comprise actuating a reversing valve (step 1018). Alternatively, flowing fluid (step 1002) may comprise running a fluid pump in one direction (step 1020), and reversing the flow (step 1010) may comprise running the fluid pump in reverse (step 1022).

Many modifications and other embodiments will come to mind to one skilled in the art to which these embodiments pertain having the benefit of the teachings presented in the foregoing descriptions and the associated drawings. Therefore, it is to be understood that modifications and other embodiments are intended to be included within the scope of the appended claims. Although specific terms are employed herein, they are used in a generic and descriptive sense only and not for purposes of limitation.

That which is claimed:

1. A plasma torch, comprising:

a main torch body;

a nozzle;

a piston in a piston cavity defined within the main torch body, the piston coupled to an electrode assembly;

a first fluid passage and a second fluid passage in communication with the piston cavity, the first fluid passage communicating with a first region of the piston cavity on a first side of the piston, and the second fluid passage communicating with a second region of the piston cavity on a second side of the piston;

a connecting pathway configured to conduct fluid between the first and second regions of the piston cavity;

the piston being configured to move the electrode assembly between a starting position and an operating position, the electrode assembly contacting the nozzle in the starting position, and the electrode assembly not contacting the nozzle in the operating position; and wherein when fluid flows in a first direction from the first fluid passage into the first region, then through the connecting pathway into the second region, and then out through the second fluid passage, the piston moves the electrode assembly to the starting position, wherein when fluid flows in an opposite second direction from the second fluid passage into the second region, then through the connecting pathway into the first region, and then out through the first fluid passage, the piston moves the electrode assembly to the operating position.

2. The plasma torch of claim 1, wherein the first fluid passage and the second fluid passage are configured to receive a flow of coolant.

3. The plasma torch of claim 2, wherein the flow of coolant comprises a flow of water.

4. The plasma torch of claim 1, further comprising a reversing valve movable between a first position and a second position, the reversing valve operable to provide flow into the first fluid passage in the first position, and operable to provide flow into the second fluid passage in the second position.

5. The plasma torch of claim 4, wherein the reversing valve comprise a four port valve.

6. The plasma torch of claim 4, wherein the reversing valve is located between the plasma torch and a fluid heat exchanger.

7. The plasma torch of claim 1, further comprising a reversible pump, the reversible pump operable to provide flow into the first fluid passage in a first mode, and operable to provide flow into the second fluid passage in a second mode.

8. The plasma torch of claim 1, wherein the electrode assembly comprises an electrode holder and an electrode.

9. The plasma torch of claim 8, wherein the electrode holder comprises a flange, wherein the flange contacts a stop within the main torch body when the electrode assembly is in the operating position.

10. The plasma torch of claim 9, further comprising a gas baffle, wherein the stop comprises the gas baffle.

11. The plasma torch of claim 1, further comprising a wave spring, wherein the wave spring contacts the nozzle so as to electrically connect the wave spring to the nozzle.

12. The plasma torch of claim 11, wherein the wave spring is configured to conduct a pilot current to the nozzle.

13. The plasma torch of claim 12, wherein the wave spring is configured to conduct a current of at least 50 amperes to the nozzle.

14. The plasma torch of claim 1, further comprising a contactor, wherein the contactor contacts the piston so as to provide electrical passage through the piston to the electrode assembly.

15. The plasma torch of claim 14, wherein the contactor is positioned circumferentially around the piston in a groove.

16. The plasma torch of claim 15, wherein the groove is in the main torch body of the plasma torch, such that the contactor contacts a first section of the piston when the electrode assembly is in the starting position and wherein the contactor contacts a second section of the piston when the electrode assembly is in the operating position.

17. The plasma torch of claim 15, wherein the groove is in the piston, such that the contactor moves with the piston.

18. The plasma torch of claim 1, wherein at least part of the connecting pathway is defined by an electrode fluid passage within the electrode assembly.

19. The plasma torch of claim 1, wherein at least part of the connecting pathway is defined by the nozzle.

20. A method of starting a plasma torch, comprising:

flowing gas through a nozzle of the plasma torch;

flowing fluid through the plasma torch in a first direction through a first fluid passage and out through a second fluid passage so as to advance a piston, whereby advancement of the piston moves an electrode assembly into contact with the nozzle;

applying a pilot arc current through the electrode assembly and the nozzle; and reversing the flow of fluid such that the fluid flows in an opposite second direction through the second fluid passage and out through the first fluid passage so as to retract the piston, whereby retraction of the piston moves the electrode assembly out of contact with the nozzle and thereby initiates a pilot arc between the nozzle and electrode assembly.

21. The method of claim 20, wherein the step of reversing the flow comprises actuating a reversing valve.

22. The method of claim 20, wherein the step of flowing fluid comprises running a fluid pump in one direction, and the step of reversing the flow comprises running the fluid pump in reverse.

* * * * *